Patented Aug. 4, 1953

2,647,903

UNITED STATES PATENT OFFICE 2,647,903

SUBSTITUTED BENZOIC ACID ESTERS AND PROCESS FOR THEIR PREPARATION

Thomas P. Carney, Indianapolis, Ind., assignor to Eli Lilly and Company, Indianapolis, Ind., a corporation of Indiana No Drawing. Application September 19, 1951, Serial No. 247,367

6 Claims. (Cl. 260—293.4)

This invention relates to 2-methylpiperidino-propyl esters of p-cycloalkylmercapto-substituted benzoic acids and acid addition salts thereof.

The new benzoic acid esters and their salts are useful therapeutic agents, being characterized by a powerful local anesthetic activity and relatively low toxicity.

The benzoic acid esters of the present invention are represented by the formula

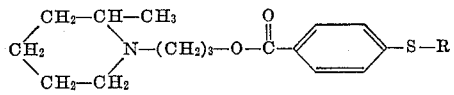

wherein R is a cycloalkyl radical having from 5 to 6 carbon atoms.

The benzoic acid esters of this invention are basic in character, and are oils at ordinary temperatures. They are soluble in oils and in the common organic solvents, but substantially insoluble in water.

The above-described esters form acid addition salts with acids. Certain of the acid addition salts, such as the hydrochloride, hydrobromide, sulfate and phosphate salts, are white crystalline compounds which are readily water-soluble. Other acid addition salts, such as the oleate and stearate, are soluble in oils.

The compounds of this invention are prepared by esterification methods. For example, 3-(2-methylpiperidino)-propyl p-cyclohexylmercaptobenzoate is prepared in the form of its hydrohalide salt by the reaction of a p-cyclohexylmercaptobenzoyl halide with 3-(2-methylpiperidino)-propanol in inert solvent solution. Preferably, however, the novel esters in the form of their salts are prepared by the reaction of a p-substituted-mercaptobenzoic acid with a 3-(2-methylpiperidino)-propyl halide in a solvent such as isopropanol to yield the desired benzoic acid ester salt. The halide of preference is the chloride, and when the chloride is used, the benzoic acid ester isolated from the reaction mixture is in the form of its hydrochloric acid addition salt. From the hydrohalide or other salt, the free base is obtained by treating the salt with an equivalent or an excess of alkali.

Acid addition salts of the benzoic acid esters are readily prepared by treating the free ester base with the stoichiometric equivalent of the appropriate acid. Furthermore, one acid addition salt can be converted to a different acid addition salt by treatment with the desired acid and preferential crystallization.

Suitable therapeutic compositions embodying the esters and salts of this invention comprise the association of the ester or salt with a suitable carrier or pharmaceutical extending medium, or other therapeutic agent. By incorporation of the esters or salts thereof with such carrier or extending medium, the anesthetic properties of the new benzoic acid esters are utilized to the greatest advantage. The extending medium can be a single compound such as water or an oil, or can comprise a multiplicity of compounds some of which in themselves may possess therapeutic properties. Thus the novel esters or salts can be utilized in the form of aqueous solutions which may be isotonic, or as oil solutions or in combination with oil-soluble ointments or water-soluble jellies. Desirably the novel cycloalkyl-mercapto-substituted benzoic acid ester or salt thereof is incorporated in the extending medium in relatively minor proportion.

The following examples illustrate therapeutic compositions comprising the novel compounds in association with extending media. For purposes of these examples 3-(2-methylpiperidino)-propyl p-cyclohexylmercaptobenzoate hydrochloride has been utilized, but it is to be understood that the other compounds of this invention also are similarly employable in therapeutic compositions of the same nature and have similar anesthetic properties to those here described. Moreover, extending media of different composition can be used. In the following examples, the percentages are expressed in terms of weight.

A. Aqueous solution

|  | Percent |
|---|---|
| 3-(2-methylpiperidino)-propyl p-cyclohexylmercaptobenzoate hydrochloride | 0.5 |
| Ringer's solution | 99.5 |

B. Oil solution

|  | Percent |
|---|---|
| 3-(2-methylpiperidino)-propyl p-cyclohexylmercaptobenzoate | 1.0 |
| Cottonseed oil | 99.0 |

C. Oil-soluble ointment

|  | Percent |
|---|---|
| 3-(2-methylpiperidino)-propyl p-cyclohexylmercaptobenzoate | 1.0 |
| Beeswax | 8.0 |
| Cholesterol | 1.0 |
| Lanolin | 15.0 |
| Stearyl alcohol | 3.0 |
| Petrolatum | 71.5 |
| Benzoin | 0.5 |

D. Water-soluble jelly

| | Percent |
|---|---|
| 3 - (2 -methylpiperidino)-propyl p-cyclohexylmercaptobenzoate hydrochloride | 0.5 |
| Glycerin | 15.0 |
| Gum tragacanth | 2.0 |
| Trisodium phosphate | 0.055 |
| Water | 82.445 |

The following examples more specifically illustrate the new substituted benzoic acid esters and their salts, and the method for their preparation.

Example 1

3 - (2 - methylpiperidino) - propyl p - cyclohexylmercaptobenzoate hydrochloride.

2.3 g. of sodium are dissolved in 100 cc. of isoamyl alcohol, and 16.8 g. of methyl p-mercaptobenzoate are added followed by 33 g. of cyclohexyl bromide. The reaction mixture is refluxed for 4 hours, cooled and filtered. The isoamyl alcohol is then distilled off under vacuum, leaving an oily residue comprising methyl p-cyclohexylmercaptobenzoate. The residue is washed with 10 percent aqueous sodium hydroxide, and is hydrolyzed by refluxing it for about 4 hours with 10 percent aqueous sodium hydroxide to convert the ester to p-cyclohexylmercaptobenzoic acid. The alkaline reaction mixture from the hydrolysis is washed with ether, and is made acid with hydrochloric acid. A precipitate comprising p-cyclohexylmercaptobenzoic acid is formed. The precipitate is filtered off and recrystallized from ethanol. p-Cyclohexylmercaptobenzoic acid melts at about 159–161° C.

A solution of 4 g. of p-cyclohexylmercaptobenzoic acid and 3 g. of 3-(2-methylpiperidino)-propyl chloride in 30 cc. of isopropyl alcohol is refluxed for about 12 hours. The solution is cooled, and anhydrous ether is added until precipitation of the 3-(2-methylpiperidino)-propyl p-cyclohexylmercaptobenzoate hydrochloride formed in the reaction is complete. The precipitate is filtered off, and recrystallized from acetone.

3-(2-methylpiperidino)-propyl p-cyclohexylmercaptobenzoate hydrochloride thus prepared melted at about 168–169.5° C. Analysis showed the presence of 3.44 percent of nitrogen and 8.60 percent of chlorine as compared with the calculated amounts of 3.40 percent of nitrogen and 8.61 percent of chlorine.

Example 2

3-(2-methylpiperidino)-propyl p-cyclohexylmercaptobenzoate.

4 g. of 3-(2-methylpiperidino)-propyl p-cyclohexylmercaptobenzoate hydrochloride are dissolved in 200 cc. of water and to the solution are added 8 cc. of 5 percent aqueous sodium hydroxide. 3-(2-methylpiperidino)-propyl p-cyclohexylmercaptobenzoate separates as an oil. The oil is extracted with ether, the ether extract is dried over anhydrous potassium carbonate and the ether is evaporated in vacuo, leaving the 3-(2-methylpiperidino)-propyl p-cyclohexylmercaptobenzoate as a colorless oily residue which is further purified by distillation under reduced pressure.

Example 3

3-(2-methylpiperidino)-propyl p-cyclopentylmercaptobenzoate hydrochloride.

The procedure of Example 1 is repeated using 5 g. of p-cyclopentylmercaptobenzoic acid and 3.9 g. of 3-(2-methylpiperidino)-propyl chloride.

3-(2-methylpiperidino)-propyl p-cyclopentylmercaptobenzoate hydrochloride thus prepared melted at about 155–157° C. Analysis showed the presence of 3.65 percent of nitrogen and 9.04 percent of chlorine, as compared with the calculated amounts of 3.52 percent of nitrogen and 8.93 percent of chlorine.

3-(2-methylpiperidino)-propyl p-cyclopentylmercaptobenzoate is prepared from its hydrochloride salt by the procedure described in Example 2.

Example 4

Preparation of acid addition salts of 3-(2-methylpiperidino)-propyl p-cyclohexylmercaptobenzoate.

To a solution in 200 cc. of ethanol, of 37.5 g. (0.1 equiv.) of 3-(2-methylpiperidino)-propyl p-cyclohexylmercaptobenzoate prepared according to the procedure of Example 4, was added a solution of 8.1 g. (0.1 equiv.) of hydrogen bromide in 50 ml. of ethanol. The mixture was thoroughly stirred and was then evaporated to dryness in vacuo. The residue, comprising 3-(2-methylpiperidino) - propyl p - cyclohexylmercaptobenzoate hydrobromide was purified by recrystallization from ethanol by the slow addition of anhydrous ether.

In the same way there are prepared the sulfuric, nitric, phosphoric, oleic, stearic, citric, maleic and malic acid addition salts of 3-(2-methylpiperidino)-propyl p-cyclohexylmercaptobenzoate. Acid addition salts of the 3-(2-methylpiperidino) - propyl p - cyclopentylmercaptobenzoate are prepared in a similar fashion.

I claim:

1. A member of the group consisting of a base and acid addition salts thereof, said base being represented by the formula

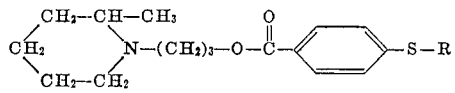

wherein R is a member of the group consisting of cycloalkyl radicals having from 5 to 6 carbon atoms.

2. 3 - (2 - methylpiperidino) - propyl p - cyclohexylmercaptobenzoate.

3. 3 - (2 - methylpiperidino) - propyl p - cyclopentylmercaptobenzoate.

4. 3 - (2 - methylpiperidino) - propyl p - cyclohexylmercaptobenzoate hydrochloride.

5. 3 - (2 - methylpiperidino) - propyl p - cyclopentylmercaptobenzoate hydrochloride.

6. 3 - (2 - methylpiperidino) - propyl p - cyclohexylmercaptobenzoate sulfate.

THOMAS P. CARNEY.

References Cited in the file of this patent

UNITED STATES PATENTS

| Number | Name | Date |
|---|---|---|
| 2,173,827 | Donleavy | Sept. 26, 1939 |

OTHER REFERENCES

Rose et al., Anesthesiology, vol. 9, pp. 373–380 (1948).

Abstracted Chem. Abs., vol. 44, p. 8505 (1950).